May 5, 1936. E. H. SMITH 2,039,564
BEER DISPENSING APPARATUS
Filed Oct. 1, 1934 3 Sheets-Sheet 2
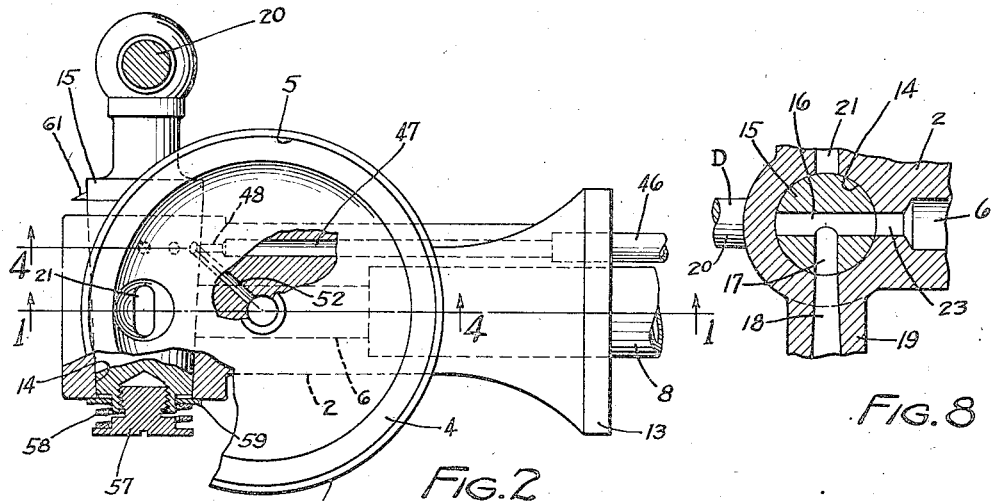
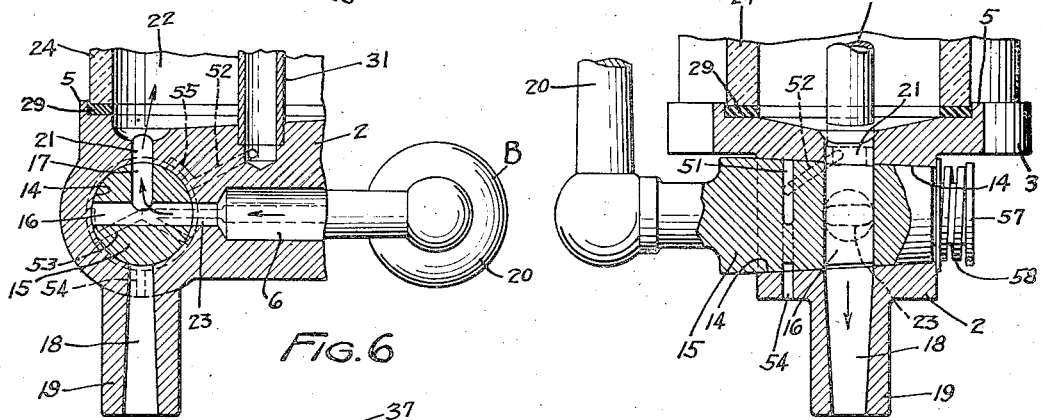
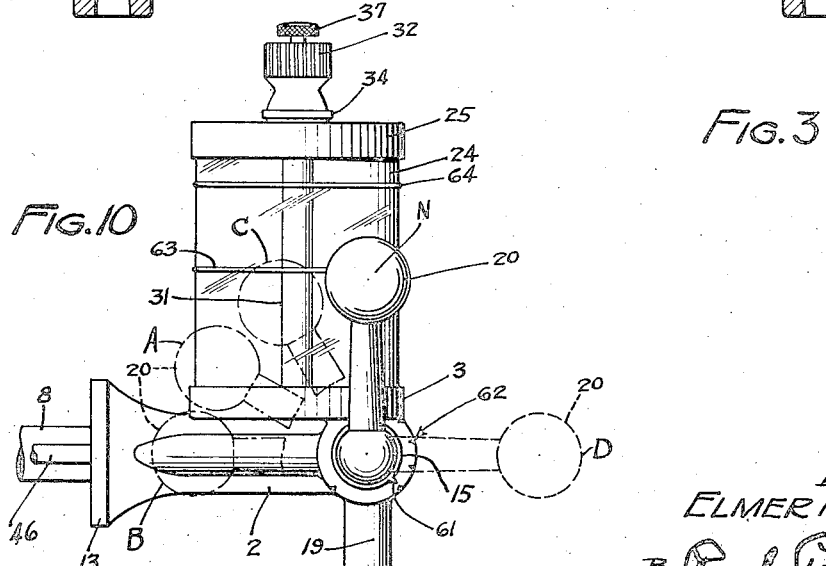
Inventor
ELMER H. SMITH
By Paul, Paul & Moore
ATTORNEYS May 5, 1936.  E. H. SMITH  2,039,564
BEER DISPENSING APPARATUS
Filed Oct. 1, 1934  3 Sheets-Sheet 3
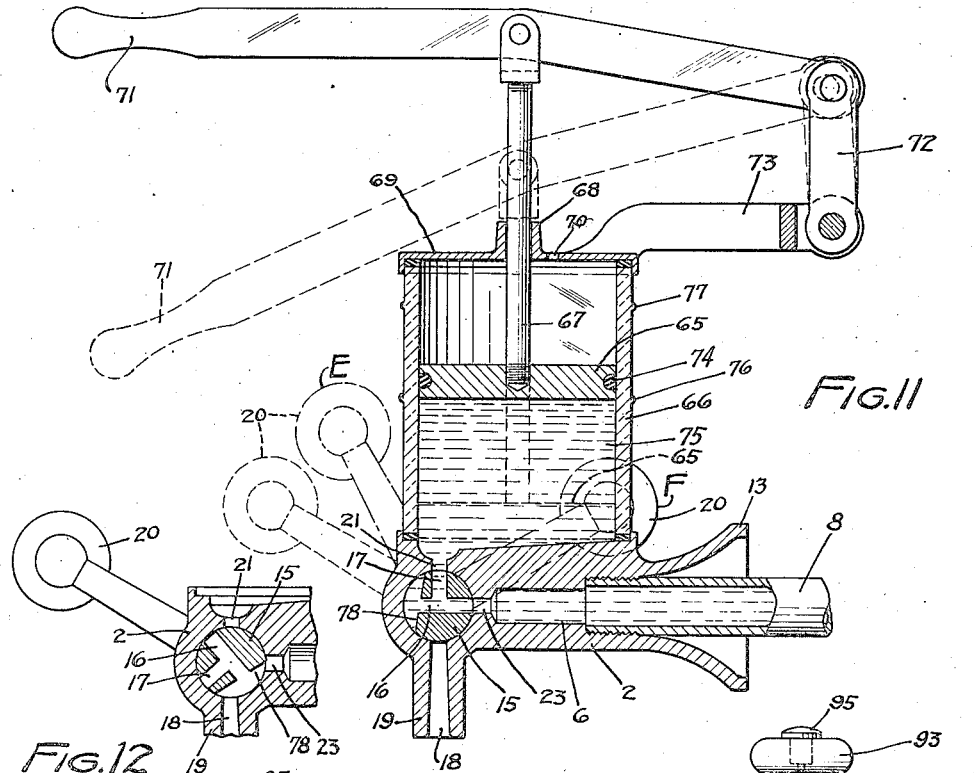
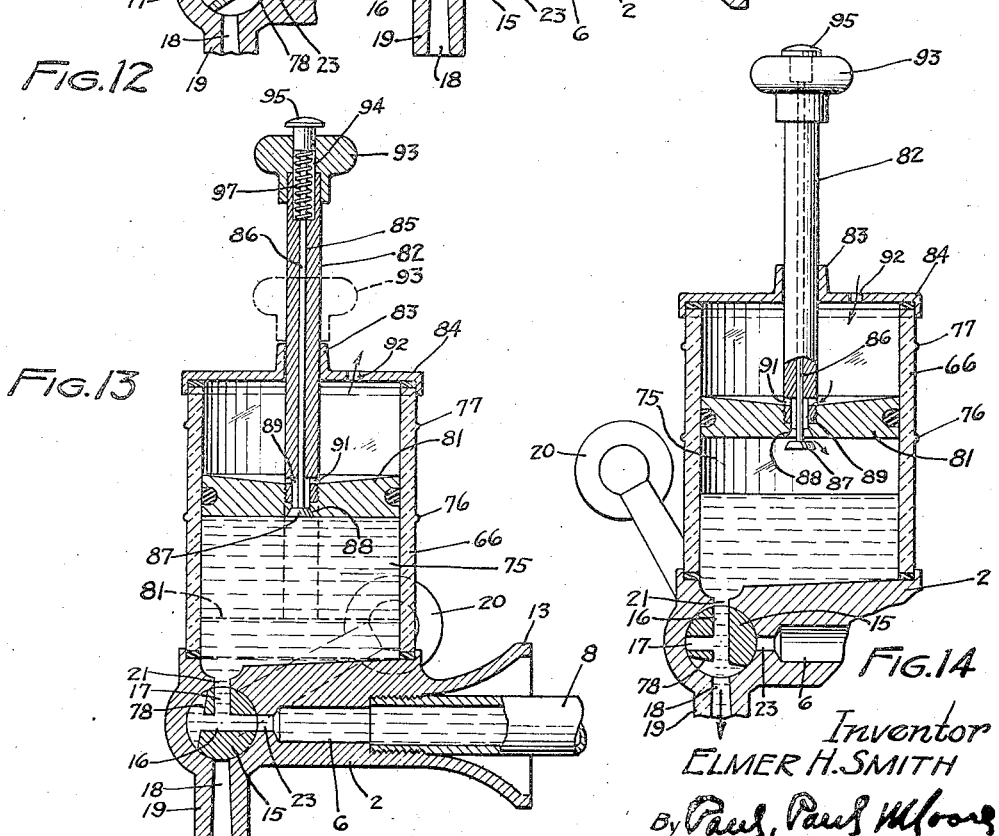
Inventor
ELMER H. SMITH
By Paul, Paul & Moore
ATTORNEYS

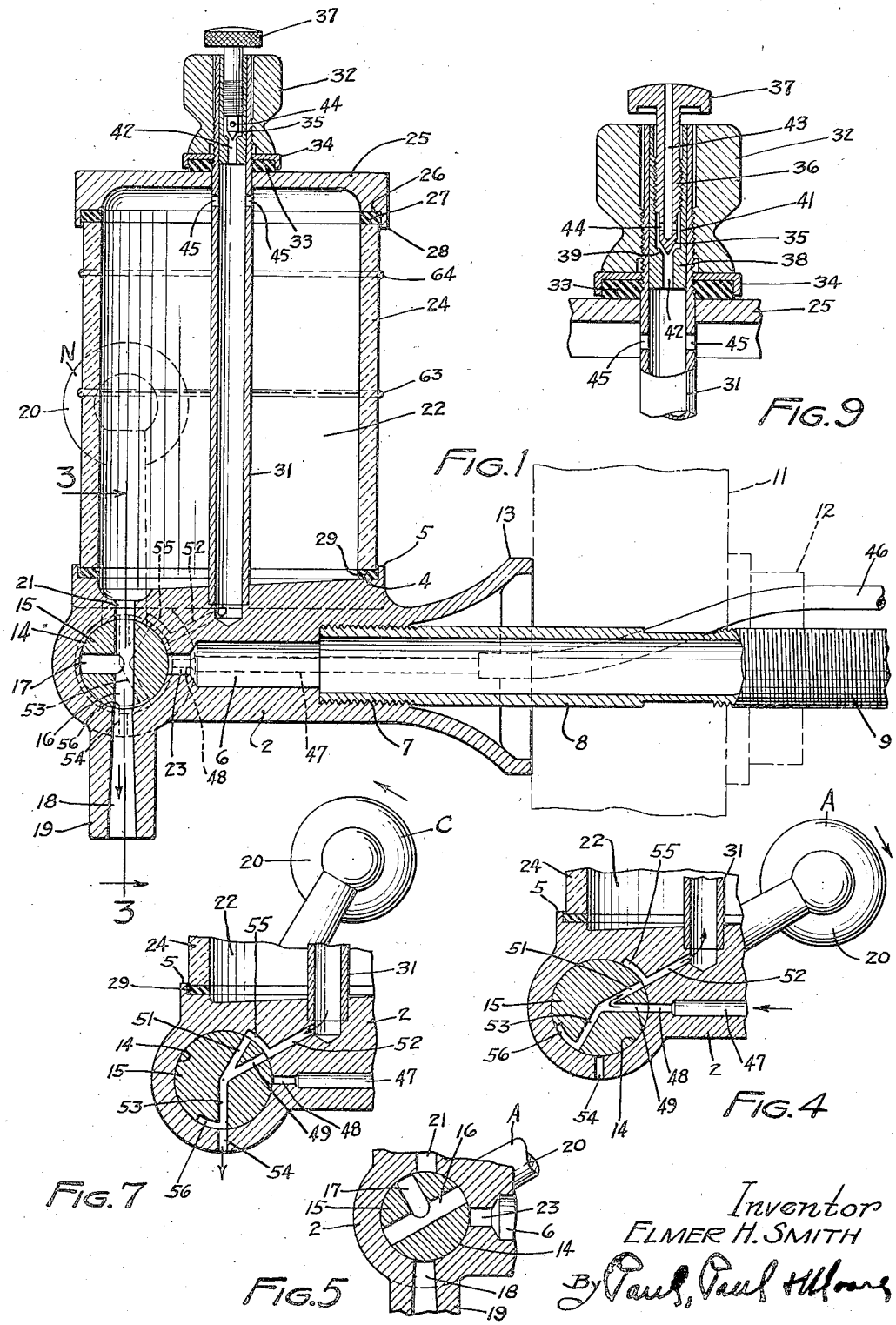

UNITED STATES PATENT OFFICE 2,039,564

BEER DISPENSING APPARATUS

Elmer H. Smith, Minneapolis, Minn., assignor to Smith Welding Equipment Corporation, Minneapolis, Minn., a corporation of Delaware Application October 1, 1934, Serial No. 746,328

11 Claims. (Cl. 225—9)

This invention relates to new and useful improvements in beer dispensing apparatus, and more particularly to a beer dispensing faucet having means embodied in the construction thereof, whereby the beer, regardless of the pressure on the beer at its source, may be dispensed into a glass or suitable container without excessive foam.

Beer dispensed from kegs or barrels is usually maintained under a relatively constant pressure in the barrel in order to preserve the quality of the beer, and to prevent it from becoming flat before it has all been drawn from the barrel. To thus maintain the beer under pressure, air from a suitable source, such as an air compressor, is introduced into the top of the barrel at a pressure sufficient to elevate the beer to the faucet, when the latter is opened. This pressure is therefore considerably higher than atmospheric pressure, in order that the beer in the barrel may be forced through the usual conduit and connections between the barrel and the faucet of the dispensing apparatus. When an ordinary beer faucet is opened, the pressure on the beer in the barrel causes a sudden release of the beer to the atmosphere, whereby the beer is violently agitated. This sudden release of pressure causes the beer to become very foamy or "wild" and results in considerable delay before a serving glass can be filled, since more beer must be added to the glass, as the foam is dissipated or settles. When a new or fresh barrel is opened, the beer is often "wild", and under such conditions, additional beer must often be added to each glass several times before the glass can be filled sufficiently to serve. The sudden release of pressure and agitation also causes the beer to lose much of the carbon dioxide gas which is present in the beer, which results in the beer losing much of its zest or flavor.

The present method of dispensing beer is also wasteful in that the foam that flows over the top of the glass carries with it, a portion of the beer, which is therefore lost, as waste. Another disadvantage of the present method of dispensing beer is that it is often very difficult for the dispenser to be sure that he is serving the same amount of beer and the same amount of foam in each glass. This results because he has no way of measuring the solid or foam-free beer that he draws into each glass.

The novel beer dispensing apparatus disclosed in the present application has been designed to remove all of the objections now common in ordinary beer dispensing apparatus. Briefly, the improved apparatus herein disclosed comprises a dispensing faucet including a body portion having a pressure chamber into which the beer is delivered from the barrel, while under pressure, air first being delivered into said pressure chamber before the beer is delivered thereto, whereby the beer is maintained under pressure until a desired, or measured quantity has been delivered into the chamber, after which the chamber is cut off from the supply of beer, and the air pressure in the chamber released, whereby the beer may be discharged from the chamber into a glass without excessive foam and substantially without losing any of the $CO_2$ gas content thereof.

An object of the invention is to provide a beer dispensing apparatus comprising a valve body having a closed chamber mounted thereon and a valve for establishing communication between said chamber and the beer supply under pressure, and means being associated with the valve and with a source of air supply, whereby when the valve is operated from its normal open position, air is first admitted into said chamber at a pressure substantially equal to the pressure on the beer at its source, after which continued operation of the valve will cut off the supply of air to the chamber, and open the latter to the beer supply, whereby beer will flow into said chamber without turbulence, and while constantly under pressure, and when the desired quantity of beer has been delivered into the chamber, the valve is operated to cut off the supply of beer thereto, after which the air pressure in said chamber is released and the valve subsequently opened to permit the beer in the chamber to discharge therefrom into a glass or suitable container without agitation and without excessive foam.

Other objects of the invention reside in the unique construction of the dispensing faucet, whereby the supply of beer and air to the pressure chamber is controlled by a single operating handle; in the specific construction of the valve and the air ports associated therewith, whereby air is admitted into the pressure chamber before the beer is delivered thereto, and is released therefrom to the atmosphere before the valve can be positioned to permit the beer to drain from said chamber into a glass; in the air control valve provided in the upper portion of the pressure chamber for constantly permitting a portion of the air therein to escape to the atmosphere; in the provision of the means whereby the beer may be drawn directly from the barrel into the glass without going through the pressure chamber; in the construction of the air control means and the beer control means, which are embodied in a single plug valve having means for automatically taking up wear, whereby it is constantly maintained leak-proof; and, in the means whereby the air control means may be connected directly to the source of air supply to the keg or barrel, whereby the maximum pressure in the pressure chamber cannot exceed the maximum pressure in the barrel.

The particular object of the invention, therefore, is to provide a beer dispensing apparatus capable of dispensing beer without excessive foam, regardless of the "wildness" of the beer at its source, and whereby the desired amount of foam may be provided on each glass of beer, and also whereby each glass may contain the same amount of solid or foam-free beer.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a vertical sectional view on the line 1—1 of Figure 2, showing the valve in its normal open position;

Figure 2 is a plan view of Figure 1, with the pressure chamber removed and showing the valve body partially broken away to more clearly illustrate the construction thereof;

Figure 3 is a detail sectional view on the line 3—3 of Figure 1;

Figure 4 is a detail sectional view on the line 4—4 of Figure 2, showing the valve positioned to admit air under pressure into the pressure chamber;

Figure 5 is a detail sectional view showing the position of the beer ports in the valve, when the latter is positioned, as shown in Figure 4;

Figure 6 is a view showing the valve positioned to permit beer to flow from the beer supply into the pressure chamber;

Figure 7 is a view showing the valve positioned to release the air from the pressure chamber just before the valve is returned to its normal open position, as shown in Figures 1 and 3;

Figure 8 is a detail sectional view showing the valve positioned to permit direct flow from the beer supply to the dispensing spout or nozzle of the valve;

Figure 9 is an enlarged detail sectional view showing the valve means provided at the upper end of the pressure chamber for venting said chamber;

Figure 10 is a side elevation of the faucet showing in full and dotted lines, various positions of the operating handle;

Figure 11 illustrates a beer dispensing faucet in which the air pressure means has been eliminated and a piston substituted therefor;

Figure 12 is a detail sectional view showing the valve positioned for drawing beer directly from the barrel into the glass;

Figure 13 illustrates a faucet comprising a chamber having a piston mounted therein, and means for admitting air into the chamber below the piston to permit the beer to be drained therefrom; and Figure 14 is a view showing the valve positioned to permit the beer to drain from the chamber of the valve, and the venting means open to permit air to be drawn into the chamber below the piston.

The novel beer dispensing faucet herein disclosed is shown comprising a body portion 2 provided with an annular portion 3 having a seat 4 therein bounded by an upstanding annular flange 5, as best shown in Figures 1 and 2. A fluid-circulating passage 6 is provided in the body 2 and terminates at one end in a threaded socket 7, adapted to receive one end of a suitable pipe connection 8, shown threaded at its opposite end, as indicated at 9, whereby it may be conveniently secured to a suitable support 11 of an ordinary apparatus, by such means as a clamping nut 12, as is customary in devices of this kind. The valve body 2 has an enlarged portion 13 adapted to seat against the support 11.

A tapered bore 14 is provided in the valve body 2 adapted to receive a tapered plug valve 15, best shown in Figure 3. This plug valve is provided with a transverse port 16 and a relatively shorter port 17, disposed at right angles to the port 16. The transverse port 16 is adapted to establish communication between a discharge opening 18, provided in the nozzle 19 of the faucet, and a port 21 establishing communication between the tapered bore 14 of the valve and a pressure chamber 22. The passage 6 communicates with the valve chamber 14 by means of a small port 23, as clearly illustrated in Figures 1 and 6. The valve 15 has a suitable operating handle 20.

The pressure chamber 22 is defined by a cylindrical wall 24, preferably of transparent glass, so that the liquid content of the pressure chamber may readily be viewed. The upper wall of the pressure chamber consists of a metallic cap 25 having an annular seat 26 adapted to receive a suitable gasket 27, which is interposed between the upper edge of the cylindrical wall 24 and the seat 26. A flange 28 on the cap 25 retains the latter in concentric relation with respect to the cylindrical wall 24. A similar gasket 29 is interposed between the lower edge of the cylindrical wall 24 and the seat 4 to prevent leakage therebetween.

The parts 24 and 25 of the pressure chamber are secured in operative positions by means of a tubular member or post 31 having its lower end suitably secured to the valve body 2, by such means as screw threads, and having its upper portion extending through an aperture in the cap 25 and threaded to receive a clamping nut 32 received in threaded engagement therewith. To prevent air leakage around the post 31 where it passes through the cap 25, a suitable gasket 33 is seated upon the cap 25 and has a retaining washer 34 engaged therewith adapted to be engaged by the lower end of the clamping nut 32, whereby the gasket may be securely clamped against the cap 25 to prevent air leakage around the post 31.

Means is provided for venting the pressure chamber 22, and is shown consisting of a small needle valve 35 provided at the lower end of a valve stem 36 having a knurled head 37 at its upper end, whereby it may be conveniently adjusted. The valve stem 36 is shown received in threaded engagement with a socket provided in the plug 38, suitably secured in the upper end of the post 31. The plug 38 has a valve seat 39 adapted to be engaged by the needle valve 35, as will readily be understood by reference to Figures 1 and 9. A small valve chamber 41 is provided around the lower end of the needle valve 35 and communicates with the interior of the post 31 through an orifice 42 and with an air duct 43 provided within the stem 36 of the needle valve, as clearly illustrated in Figure 9. Transverse ducts 44 establish communication between the valve chamber 41 and the air duct 43, whereby when the valve 35 is open, as shown in Figures 1 and 9, the pressure chamber 22 is open to the atmosphere through the valve mechanism, above described, and a pair of transverse ports 45 provided in the wall of the post 31.

An important feature of the invention resides in the means provided for admitting air under pressure into the pressure chamber 22 before the valve 15 can be rotated to the position shown in Figure 6, to permit the flow of beer from the supply pipe 8 to said chamber. Such means is best shown in Figures 2 and 4, and is shown comprising a conduit 46 having one end connected to the valve body 2, and its opposite end suitably connected to a source of air supply under pressure, preferably the source which supplies air pressure to the barrel or keg from which the beer is being drawn.

A suitable air passage 47 is provided in the valve body and connects the conduit 46 with the valve bore 14, as shown in Figures 2 and 4. The passage 47 is shown reduced in size at its discharge end, as indicated at 48 in Figure 4. Ports 49 and 51 are provided in the plug valve 15 and are preferably arranged as shown in Figure 4, whereby when the valve is positioned as shown in this figure, the port 49 registers with the orifice 48 of the passage 47, and the port 51 with a port 52 having one end connected to the tubular member or hollow post 31 within the pressure chamber 22. It will thus be seen, by reference to Figure 4, that when the valve is positioned as there shown, the pressure chamber is in direct communication with the conduit 46, whereby air under pressure is delivered to said chamber.

Means is also provided in the valve for releasing the air under pressure from the chamber 22, and consists of a port 53 provided in the plug valve 15 and having one end communicating with the converging ends of the ports 49 and 51, and its opposite end adapted to register with a discharge orifice 54 provided in the valve body, as shown in Figures 4 and 7. The port 53 is arranged at a slight angle with respect to the ports 49 and 51, so that when the operating handle 20 reaches the position shown in Figure 7, the port 53 will register with the orifice 54, whereby the pressure chamber is opened directly to the atmosphere to permit the air therein to escape, as will readily be understood by reference to Figure 7. The wall of the bore 14 of the plug valve 15 is cut away, as shown at 55 in Figures 4 and 7, and the plug valve 15 is also provided with a cutaway portion, as shown at 56. These cutaway portions provide means for retaining the ports 52 open to the atmosphere, while the operating handle 20 is being moved from the position shown in Figure 7 to its normal position, shown in Figures 1 and 10. It will also be noted, by reference to the dotted lines in Figure 1, that when the operating handle is in its normal valve open position, the cutaway portions 55 and 56 will establish communication between the port 52 and the discharge orifice 54, so that pressure in the chamber 22 will be maintained at atmospheric pressure, whereby the beer may readily drain from the chamber 22 through the nozzle 19.

The plug valve 15 is shown retained in its bore by a suitable flanged adjusting nut 57, received in threaded engagement with a socket provided in the end valve and having one end of a spring 58 engaged therewith. The opposite end of the spring is seated against a washer 59 bearing against the valve body, as best shown in Figure 2, and constantly exerts an outward force against the nut 57 to thereby retain the valve in leakproof engagement with the bore 14. The spring 58 also acts to automatically take up wear in the valve.

Means is provided in connection with the operating handle for indicating the position of the plug valve 15 whereby the operator or dispenser may know the positions of the ports in the valve 15 with respect to the ports provided in the valve body. This indicating means is best shown in Figure 10, and may consist of a small pointer 61 secured to the enlarged end of the plug valve 15 and cooperating with a series of marks or suitable indicia 62, provided upon the adjacent end of the valve body. Suitable marks 63 and 64 are also provided in the cylindrical wall 24 of the chamber 22 to facilitate measuring the amount of beer delivered into each glass. In other words, the mark 63 on the casing 24, may represent eight ounces of beer in the chamber 22, and the mark 64, fourteen ounces. By this arrangement, the beer dispensed in each glass may be measured, so that each glass will contain the same amount of foam-free beer.

*Operation*

The operating handle 20 is normally positioned, as shown in Figures 1 and 10, wherein the passage 16 in the plug valve 15 is alined with the ports 21 and 18 provided in the valve body, whereby the pressure chamber 22 is in direct communication with the atmosphere, as is clearly illustrated in Figure 1. It will be noted, by reference to this figure, that the passage formed by the ports 21, 16, and 18, is substantially straight and free from sharp corners or bends, whereby the beer may flow therethrough without being agitated. When it is desired to draw a glass of beer, the operating handle 20 is moved from its neutral position, indicated by the letter N in Figures 1 and 10, to the position A, shown in Figures 4 and 5, wherein it will be noted that the ports 49 and 51 are in registration with the ports 48 and 52 in the valve body, thereby connecting the pressure chamber 22 directly to the air supply pipe or tube 46, whereby pressure is immediately introduced therein. The operating handle is then moved to its horizontal position, indicated by the letter B in Figures 6 and 10, whereby the supply of air to the pressure chamber is cut off, and the chamber 22 is connected directly to the beer line or pipe 8, as best shown in Figure 6.

The air valve 35 for venting the pressure chamber 22 may be permanently positioned to allow the air in the pressure chamber to slowly escape therefrom, the escaping of the air through this valve controlling the delivery of the beer into the chamber 22, when the valve 15 is positioned as shown in Figure 6. In other words, the pressure in the chamber 22 may be lower than the pressure on the beer at its source, so that the pressure on the beer in the barrel will force the beer through the usual connections between the barrel and the dispensing faucet, into the pressure chamber 22. When the desired or a measured amount of beer has been delivered into the pressure chamber 22 as, for example, eight ounces, the operating handle 20 is moved from the position indicated by the letter B, to that shown at C in Figure 10. Such movement of the handle will cause the ducts 49 and 51 to pass over the duct 52 and cutaway portion 55, whereby the pressure in the chamber 22 is temporarily restored to its full pressure, until the duct 49 moves out of registration with the duct 48, as shown in Figure 7.

When the operating handle reaches the position shown at C in Figure 7, the ducts 49 and 52 are alined, and at the same time the ducts 43 and 54 are alined, whereby the air within the chamber 22 may escape directly to the atmosphere, as indicated by the arrows in Figure 7, whereby the pressure in said chamber drops to atmospheric. The valve is then returned to its normal position, indicated at N in Figures 1, 3, and 10, whereby the valve is opened to permit the beer in the chamber 22 to drain therefrom by gravity, through the passage 18 of the nozzle 19, and into a serving glass or other suitable receiving means. Because of the ducts 52 and 53 being elongated, as shown at 55 and 56, the duct 52 is retained open, when the operating handle 20 is in its neutral or open position, indicated at N in Figures 1 and 10, whereby the chamber 22 is in direct communication with the atmosphere, to thereby permit the beer to drain by gravity from the chamber 22, as indicated by the arrows in Figure 1.

It will thus be seen that the arrangement of the air ducts in the valve body 2 and plug valve 15 are such that air is automatically introduced into the pressure chamber and released therefrom, while the operating handle 20 is being operated to draw the beer from the barrel.

In actual operation, it has been found, with a pressure of say, from 10 to 15 pounds upon the beer at the source of supply, it is not necessary to bring the operating handle to a complete stop, when the ducts 49 and 51 of the valve pass the air ducts 48 and 52, in the valve body, because the ducts are of such size that the flow of air from the duct 47 to the pressure chamber is almost instantaneous, whereby a very slight retardation in the movement of the operating handle will permit ample flow of air to the chamber to build up the desired pressure therein. In like manner, when the handle is moved from the position B, to its normal valve opening position N, the air ducts are so arranged that all of the pressure in the chamber is released to the atmosphere, before the valve can be opened to the flow of beer from said chamber, whereby the beer will flow by gravity in a non-turbulent, smooth stream into the receiving glass or container, whereby the latter may be filled without excessive foam.

Should the beer not have a sufficient foam thereon when dispensed in the glass, then the dispenser simply moves the operating handle from the position N to the position D, whereby the discharge orifice 18 of the nozzle 19 is connected directly to the beer supply pipe 8, as clearly illustrated in Figure 8, whereby the beer will be forced through the ports in the plug valve 15, into the glass by the pressure on the beer in the keg or barrel, thereby agitating the beer and causing it to foam violently.

If the beer in the keg is found to be rather flat, which often results if it has been stored in the keg or barrel for some time, the operator may use the dispensing faucet herein disclosed, in the same manner as an ordinary dispensing faucet. In other words, instead of manipulating the operating handle so that the beer must first flow into the pressure chamber 22, before being dispensed into the glass, the handle is operated in the opposite direction or from the position N to the position D, whereby the beer does not enter the pressure chamber 22, but is drawn directly from the keg into the glass.

It will thus be seen that the novel beer dispensing faucet herein disclosed is capable of dispensing beer without excessive foam, regardless of the pressure on the beer at its source, or the wildness thereof. It has also been found that beer dispensed through the valve herein disclosed, has a better flavor than beer dispensed in the usual manner, because substantially all of the normal $CO_2$ gas content of the beer is retained therein. When dispensing beer in the usual manner, a large portion of the $CO_2$ gas content is lost before the beer is consumed, because of the inherent tendency of the beer to foam excessively. As hereinbefore stated, beer dispensed from the improved faucet herein disclosed may be delivered into the serving glass substantially without foam, if desired, regardless of the wildness of the beer, which has heretofore been found impossible with ordinary dispensing apparatus, because of the inability to control the beer with such apparatus.

The faucet is very simple and inexpensive in construction, and its operating handle 20 is manipulated in substantially the same manner as the operating handle of an ordinary beer dispensing faucet. The walls of the pressure chamber 22 being of glass, permits the dispenser to accurately measure the beer dispensed from the faucet so that each customer will be sure of receiving exactly the same quantity of beer. This is made possible by dispensing the beer in the novel manner herein disclosed, whereby it is not agitated, and therefore does not excessively foam when dispensed from the faucet. The valve may readily be taken apart for cleaning by simply removing the nut 57 secured to one end of the plug valve, and by unscrewing the nut 32 at the top of the pressure chamber, whereby the cylindrical wall 24 of the pressure chamber 22 may readily be detached, when necessary.

Figure 11 illustrates a faucet in which the air pressure means shown in the previous figures has been dispensed with and, in place thereof, a piston 65 is shown mounted in a casing 66, similar to the casing 24 shown in Figures 1 and 10. The piston 65 has a rod 67 extending upwardly through a guide 68 provided in a closure 69, supported upon the casing 66 and secured to the body 2 of the faucet by suitable means, not shown, whereby the casing 66 and the closure 69 are rigidly secured to said body. A suitable operating lever 71 is pivotally connected to the upper end of the connecting rod 67, as clearly illustrated in the drawings, and has one end pivotally connected to a link 72 supported upon an arm 73, here shown integrally formed with the closure 69.

The piston 65 is provided with a suitable packing 74, whereby the interior of the casing 66 below the piston 65 forms an air tight chamber 75 into which the beer is delivered from the pipe 8, in substantially the manner shown and described with reference to Figure 1.

In the operation of the faucet shown in Figure 11, the operating handle 20 is moved from its normal position, indicated at E in Figure 11, to the position F, whereby the plug valve 15 is rotated so that the passages 16 and 17 thereof register with the passages 23 and 21, respectively, in the valve body. When the valve is thus positioned, the beer flows directly into the chamber 75 from the supply pipe 8. Before beer is admitted into the chamber 75, the piston is moved to its lowermost position, as indicated by the dotted lines in Figure 11, whereby when the beer flows into the chamber 75, it will impinge against the piston and gradually elevate it, as a result of the pressure on the beer in the barrel, until the level of the beer in the chamber 75 reaches one of the level marks 76 or 77 provided upon the casing 66, whereupon the valve is operated to cut off the supply of beer to the chamber 75. The beer which has thus been delivered into the chamber 75 will retain the $CO_2$ gas therein, as it is not exposed to the atmosphere because of the piston sealingly engaging the walls of the casing 66.

The operating handle 20 is then moved to the dotted line position E, whereby the passage 16 establishes communication between the discharge opening 18 of the nozzle 19 and the discharge opening 21 in the bottom of the chamber 75, whereupon the beer will discharge by gravity from the chamber 75 into a glass or other receiving means, without agitation and without losing any of the $CO_2$ gas content thereof. To prevent the formation of a vacuum in the chamber 75 above the level of the beer, the lever 71 may be gradually moved downwardly from the full to the dotted line position, shown in Figure 11. By thus discharging the beer from the chamber 75 into the glass, the beer will not foam excessively, as when drawn directly from the pipe 8 into the glass.

The plug valve 15 is shown provided with a cutaway portion 78, whereby beer may be drawn directly from the supply pipe 8 into the glass when the operating handle 20 is moved slightly forwardly from the position E in Figure 12, to the position G, whereby the cutaway portion 78 will span the fluid passages 18 and 23 to thereby permit a limited direct flow therethrough. When the handle is moved forwardly from the position E, the beer does not pass through the pressure chamber 75, but is delivered directly to the glass or receiving means from the supply pipe 8. When the beer is being delivered into the chamber 75 from the supply pipe 8, the piston 65, as a result of its frictional engagement with the walls of the chamber, will maintain a pressure on the beer in the chamber 75 until the plug valve 15 is opened to permit the beer to drain from said chamber, as hereinbefore stated. A suitable vent 70 is provided in the closure 69 to permit air to circulate into and out of the casing 66, when the piston 65 is operated.

In Figures 13 and 14, there is shown a faucet comprising a piston 81 having a rod 82 secured thereto and supported in a guide 83 provided in a closure 84 seated on the casing 66. The rod 82 has an axial bore 85 adapted to receive a valve stem 86, the lower end of which is provided with a suitable valve head 87 adapted to engage a seat 88 in the lower face of the piston 81. A small valve chamber 89 is provided above the valve seat 88, and communicates with the interior of the casing 66 above the piston, through suitable transverse ducts 91. A vent hole 92 is provided in the closure 84, whereby air may circulate freely into and out of the upper portion of the casing 66, when the piston is operated.

The rod 82 is provided at its upper end with a suitable finger grip or knob 93, shown having a bore 94 therein adapted to receive a button 95 secured to the upper end of the valve stem 86. A suitable compression spring 97 constantly urges the valve stem in an upward direction to seat the valve 87.

In the form shown in Figures 13 and 14, when the chamber 75 below the piston is empty, the piston will be positioned in its lowermost position, as indicated by the dotted lines in Figure 13, and the valve 87 will be closed. When the operating handle 20 of the faucet is operated to permit the flow of beer into the chamber 75 from the pipe 8, the piston is gradually elevated by the pressure of the beer thereagainst, whereby the beer is constantly maintained under pressure until the desired amount of beer has been delivered into the chamber, whereupon the plug valve 15 is operated to shut off the supply of beer to the chamber 75.

To drain the beer from the chamber 75, the operator opens the plug valve 15 and then depresses the button 95, whereby the valve 87 is opened. When the valve 87 is open, the beer in the chamber 75 may freely flow by gravity through the valve 15 and into the glass or receiving means in substantially the same manner as shown and described with reference to Figure 1. As soon as all of the beer has been drained from the chamber 75, the operator depresses the piston to its lowermost position, whereupon the operating handle 20 of the faucet may again be manipulated to deliver another quantity of beer into the chamber 75. The closure 84 is secured to the valve body 2 by suitable means, not shown in the drawings. The upper end or face of the piston 81 is preferably slightly dished, or concaved, whereby should any of the beer accidentally escape from below the piston into the upper portion of the casing, above the piston, said beer may readily drain through the valve chamber 89 in the piston, into the chamber 75 below the piston, through the open valve 87, as will readily be understood by reference to Figure 14.

The apparatus is very simple, and the beer delivered into the chamber 75 is maintained under pressure therein until the plug valve 15 is rotated to cut off the supply of beer to said chamber from the supply pipe 8, after which the valve 15 may be opened, as shown in Figure 14, to permit the beer to flow smoothly into a serving glass without agitation and excessive foam.

If necessary, the pistons shown in Figures 11 and 13 may be weighted, to thereby maintain a relatively greater pressure on the beer in the chamber 75, before releasing the beer therefrom. It is to be understood, however, that the pressure must be released from the beer in the chamber 75, before the beer is drained therefrom, otherwise the beer would initially be forced from the discharge nozzle by the pressure in said chamber, with the result that it might foam excessively.

I claim as my invention:

1. A beer dispensing faucet comprising a body having a pressure chamber thereon adapted to be connected to a source of beer under pressure and an air supply under pressure, valve means for controlling the supply of air and beer to and from said pressure chamber, said valve means comprising a single operating member and adapted upon movement in one direction by said member, to admit air into said chamber and thereafter a measured quantity of beer, and when said valve means is moved in the opposite direction by said single operating member, the supply of beer to said chamber is cut off, and the air released therefrom, whereby the beer may be drawn from said chamber without agitation and excessive foam, and means whereby the beer may be drawn directly from said beer supply through the valve means to the receiving means without passing through said pressure chamber.

2. A beer dispensing faucet comprising a body having a pressure chamber thereon adapted to be connected to a source of beer under pressure and an air supply under pressure, valve means for controlling the supply of air and beer to and from said pressure chamber, said valve means comprising a single operating member and adapted upon movement in one direction by said member, to admit air into said chamber and thereafter a measured quantity of beer, and when said valve means is moved in the opposite direction by said single operating member, the supply of beer to said chamber is cut off, and the air released therefrom, whereby the beer may be drawn from said chamber without agitation and excessive foam, and means whereby the beer may be drawn directly from said beer supply through the valve means to the receiving means without passing through said pressure chamber.

3. A beer dispensing faucet comprising a body having a discharge nozzle, said body having a chamber thereon, means for connecting said chamber to a beer supply under pressure means for establishing communication between the chamber and the beer supply, pressure means for retaining the beer under pressure in the chamber, means for cutting off the supply of beer to the chamber, means independent of the nozzle for releasing the pressure on the beer in said chamber to prevent the formation of a vacuum therein, whereby the beer may be drained therefrom into a container without excessive foam, and means whereby the beer may be drawn directly from the supply into the glass without passing through said chamber.

4. A beer dispensing faucet comprising a body having a valve therein, a conduit connecting said valve to a barrel having beer under pressure therein, said body having a closed chamber thereon communicating with the valve, means for admitting air under pressure into the chamber before the beer is delivered thereto, and whereby the beer may be retained under pressure while in said chamber, means for cutting off the supply of air to the chamber and releasing the air therefrom, before the valve can be rotated to a position to permit the beer to drain by gravity from the chamber into a suitable receiving means, and a metered orifice in the upper portion of said chamber for gradually releasing a portion of the air from said chamber, thereby to cause the beer to flow into the receptacle from the barrel without agitation.

5. A beer dispensing faucet comprising a body having a passage therein, means for connecting said passage to a supply of beer under pressure, a valve in said body communicating with said passage, said body having a pressure chamber thereon provided with a discharge opening, means in the valve for establishing communication between the beer supply and said chamber, means operable by manipulation of the valve for admitting air under pressure into said chamber whereby the beer delivered thereto is maintained under pressure, means requiring that the pressure in said chamber be released therefrom before the valve can be opened to permit the beer to drain therefrom, and a metered orifice independent of said valve for gradually releasing a portion of the air from said chamber, thereby to control the flow of beer thereto from said passage.

6. A beer dispensing faucet comprising a body having a passage therein, means for connecting said passage to a supply of beer under pressure, a valve in said body communicating with said passage, said body having a pressure chamber thereon provided with a discharge opening, means in the valve for establishing communication between the beer supply and said chamber, means operable by manipulation of the valve for admitting air under pressure into said chamber before the beer can be delivered thereto from said passage, and whereby the beer delivered to the chamber may be maintained under pressure, means in the valve for releasing the pressure from said chamber before the valve can be operated to permit the beer to drain therefrom into a suitable receiving means, and a metered orifice in the upper portion of the chamber for gradually releasing a portion of the air from the chamber, thereby to control the flow of beer to the chamber from said passage.

7. A beer dispensing faucet comprising a body having a passage therein communicating with a supply of beer under pressure, said body having a pressure chamber thereon provided at its bottom with a discharge opening, a valve interposed between said discharge opening and said passage for controlling the flow of beer from the beer supply to said chamber, a discharge orifice in said body adapted to be connected to the discharge opening of the chamber by manipulation of said valve, means associated with said valve for admitting air under pressure into said chamber before admitting beer thereto, means made operable by rotation of the valve to release the pressure on the beer in said chamber, before the valve can be opened to permit the beer to discharge from the chamber, and means independent of said valve for gradually releasing the pressure in said chamber, thereby to control the flow of beer thereto from said passage.

8. A beer dispensing faucet comprising a body, a plug valve mounted therein and provided with suitable ports, said body having a pressure chamber thereon, air supply means, means in said valve for establishing communication between said air supply means and said pressure chamber, and whereby when the valve is initially operated, air under pressure is delivered into said pressure chamber before the beer is delivered thereto, whereby a pressure is maintained on the beer in said chamber to thereby prevent the escape of the $CO_2$ gas content thereof, means made operable by reverse movement of the valve to release the air from said pressure chamber, whereby when the valve is positioned to permit the discharge of the beer from said chamber, the beer may be delivered into a glass without agitation and without excessive foam, and means independent of said plug valve for releasing a portion of the air pressure in said chamber, thereby to control the flow of beer thereto from the beer supply.

9. A beer dispensing faucet comprising a body having a tapered plug valve rotatably mounted therein and provided with suitable ports, a beer supply under pressure connected to said valve, a transparent casing mounted on said valve body and providing a pressure chamber having a discharge opening communicating with the valve, said body also having a discharge nozzle adapted for connection with the discharge opening of said chamber by rotation of said valve, a hollow post in said chamber having an air duct connecting the lower end thereof to the valve, valve means at the upper end of said post for permitting a portion of the air in said chamber to escape to the atmosphere from said pressure chamber, air supply means also connected with the plug valve, and means in said plug valve for establishing communication between said air supply means and said hollow post, whereby when the plug valve is rotated in one direction, air under pressure is delivered into the pressure chamber, and subsequently beer is delivered thereto from the beer supply, and means whereby when said valve is rotated in the opposite direction, the air is released from said pressure chamber before the valve can be positioned to permit the beer to discharge therefrom, whereby the beer will drain from said chamber without agitation and excessive foam.

10. A beer dispensing faucet comprising a body having a pressure chamber adapted to be connected to a source of beer supply under pressure, and an air supply under pressure, valve means for controlling the supply of beer into and from the pressure chamber, a single operating member for actuating said valve means adapted, upon movement in one direction, to cause the valve means to admit air into the chamber and thereafter beer, and when said operating member is moved in the opposite direction, said valve means is operated to cut off the supply of beer to the chamber and release the air therefrom, whereby the beer may be drawn from the chamber without agitation and excessive foam, and means whereby beer may be drawn directly from the beer supply into the receiving means without passing through the pressure chamber.

11. A beer dispensing faucet comprising a body having a pressure chamber adapted to be connected to a source of beer supply under pressure, and an air supply under pressure, valve means for controlling the supply of beer into and from the pressure chamber, an operating member for actuating said valve means adapted, upon movement in one direction, to cause, the valve means to admit air into the chamber and thereafter beer, and when said operating member is moved in the opposite direction, said valve means is operated to cut off the supply of beer to the chamber and release the air therefrom, whereby the beer may be drawn from the chamber without agitation and excessive foam, means whereby beer may be drawn directly from the beer supply into the receiving means without passing through the pressure chamber, and means for venting the upper portion of said chamber to prevent the formation of a vacuum therein, when the beer is draining by gravity therefrom.

ELMER H. SMITH.